(12) United States Patent
Ubeda Castellanos et al.

(10) Patent No.: US 10,212,670 B2
(45) Date of Patent: Feb. 19, 2019

(54) METHOD AND NETWORK NODE FOR OBTAINING NOMINAL POWER AND PATHLOSS COMPENSATION FACTOR OF A POWER CONTROL PROCESS

(71) Applicant: Telefonaktiebolaget LM Ericsson (publ), Stockholm (SE)

(72) Inventors: Carlos Ubeda Castellanos, Madrid (ES); José Ángel Fernández Segovia, Campanillas (ES); Salvador Luna Ramírez, Malaga (ES); Matías Toril Genovés, Málaga (ES); Ana Belen Vallejo Mora, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/509,108

(22) PCT Filed: Sep. 10, 2014

(86) PCT No.: PCT/SE2014/051042
§ 371 (c)(1),
(2) Date: Mar. 6, 2017

(87) PCT Pub. No.: WO2016/039674
PCT Pub. Date: Mar. 17, 2016

(65) Prior Publication Data
US 2017/0289922 A1    Oct. 5, 2017

(51) Int. Cl.
*H04W 52/24*    (2009.01)
*H04W 24/02*    (2009.01)
(Continued)

(52) U.S. Cl.
CPC ......... *H04W 52/242* (2013.01); *H04W 24/02* (2013.01); *H04W 52/10* (2013.01);
(Continued)

(58) Field of Classification Search
CPC ............. H04W 52/242; H04W 52/246; H04W 52/247; H04W 52/248; H04W 52/367;
(Continued)

(56) References Cited

U.S. PATENT DOCUMENTS

2008/0166976 A1* 7/2008 Rao .................. H04W 52/10
455/69
2009/0111503 A1* 4/2009 Pedersen ............ H04W 52/10
455/522

(Continued)

FOREIGN PATENT DOCUMENTS

EP        2566261 A2    3/2013
WO    WO 2011 000154    1/2011
WO    WO2015/011557    * 7/2014 ............ H04W 52/14

OTHER PUBLICATIONS

Analytic Uplink Cell Load Approximation for Planning Fractional Power Control in LTE Networks by Kurt Majewski and Michael Koonert—IEEE 2010.

(Continued)

*Primary Examiner* — Warner Wong
(74) *Attorney, Agent, or Firm* — Sage Patent Group

(57) ABSTRACT

A method and a network node (110) for obtaining a nominal power "$P_0$" of transmissions on an uplink channel and a pathloss compensation factor "$\alpha$" are disclosed. The cell (101) is associated to a non-regular scenario, at least partly defined by respective locations of further cells of the cellular network (100). The further cells are neighbors to the cell (101), which is located at a location within the cellular network (100). The network node (110) generates, for each further cell, a respective regular scenario in relation to the cell (101). The generation is at least based the respective location corresponding to said each further cell and the location of the cell (101). The network node (110) determines, also for each further cell, a respective $P_0$ and a (Continued)

respective α for each respective regular scenario. The network node (110) applies a statistical formula to each of the respective $P_0$ and the respective α to obtain the nominal power and the path loss compensation factor to be applied by the user equipment (120) in the cell (101).

18 Claims, 7 Drawing Sheets

(51) Int. Cl.
*H04W 52/10* (2009.01)
*H04W 52/36* (2009.01)
*H04W 52/14* (2009.01)
*H04L 27/26* (2006.01)
*H04L 25/02* (2006.01)
*H04W 52/26* (2009.01)
*H04W 52/38* (2009.01)

(52) U.S. Cl.
CPC ....... *H04W 52/146* (2013.01); *H04W 52/367* (2013.01); *H04L 25/0222* (2013.01); *H04L 27/2695* (2013.01); *H04W 52/243* (2013.01); *H04W 52/267* (2013.01); *H04W 52/386* (2013.01)

(58) Field of Classification Search
CPC ....... H04W 24/02; H04W 52/00–52/60; H04L 1/0026; H04L 25/0202; H04L 25/0222; H04L 25/0238; H04L 27/2695
See application file for complete search history.

(56) References Cited

U.S. PATENT DOCUMENTS

| | | | | |
|---|---|---|---|---|
| 2009/0286566 A1* | 11/2009 | Lindholm | ............ | H04W 52/10 455/522 |
| 2010/0067496 A1* | 3/2010 | Choi | ............ | H04W 52/54 370/336 |
| 2010/0273488 A1* | 10/2010 | Kim | ............ | H04W 24/10 455/436 |
| 2011/0111766 A1* | 5/2011 | Yang | ............ | H04W 52/241 455/452.2 |
| 2011/0183702 A1 | 7/2011 | Weaver et al. | | |
| 2012/0052904 A1* | 3/2012 | Gao | ............ | H04W 52/242 455/522 |
| 2012/0295611 A1* | 11/2012 | Amirijoo | ............ | H04W 52/146 455/424 |
| 2013/0225226 A1* | 8/2013 | Manssour | ............ | H04W 52/242 455/522 |
| 2013/0281093 A1* | 10/2013 | Jung | ............ | H04W 52/38 455/436 |
| 2013/0310102 A1 | 11/2013 | Chao et al. | | |
| 2014/0022961 A1* | 1/2014 | Park | ............ | H04W 52/146 370/280 |
| 2014/0036786 A1* | 2/2014 | Kazmi | ............ | H04W 52/146 370/329 |
| 2014/0051475 A1 | 2/2014 | Cheng et al. | | |
| 2015/0319702 A1* | 11/2015 | Patel | ............ | H04W 52/10 455/522 |
| 2017/0078974 A1* | 3/2017 | Koutsimanis | ............ | H04W 52/146 |

OTHER PUBLICATIONS

Self-Organizing Networks in Next Generation Radio Access Networks: Application to Fractional Power Control by Mariana Dirani and Zwi Altman; Computer Networks 55—2011.
Low Cost Network Performance Estimators Computation in LTE Irregular Scenarios by Fernandez-Segovia et al.—Sep. 2013.
Performance of Uplink Fractional Power Control in UTRAN LTE by Carlos Ubeda Castellanos et al.—IEEE 2008.
Coverage and Capacity Optimization in LTE Network Based on Non-Cooperative Games by Xu Sen et al.; The Journal of China Universities of Posts and Telecommunications; Available online at www.sciencedirect.com—Aug. 2012.
International Search Report for International application No. PCT/SE2014/051042—dated Jun. 1, 2015.
Omer Bulakci et al: "Joint optimization of uplink power control parameters in LTE-Advanced relay networks", Wireless Communications and Mobile Computing Conference (IWCMC), 2011 7th International, IEEE, Jul. 4, 2011 (Jul. 4, 2011), pp. 2064-2069, XP031925924, DOI: 10.1109/IWCMC.2011.5982852 ISBN: 978-1-4244-9539-9* section III-III.A; p. 3-4*.
Supplementary European Search Report—EP 14901702.2—dated Feb. 19, 2018—pp. 5.
Nokia Siemens Networks et al.: "Uplink co-channel HetNet performance and PC optimization", 3GPP Draft: R1-112381, 3rd Generation Partnership Project (3GPP), Mobile Competence; 650, Route Des Lucioles ; F-06921 Sophia-Antipolis Cedex; France, vol. RAN WG1, no. Athens, Greece; Aug. 22, 2011, Aug. 16, 2011 (Aug. 16, 2011), XP050537505, [retrieved on Aug. 16, 2011] * section1, 3; p. 1-3*.

* cited by examiner

METHOD AND NETWORK NODE FOR OBTAINING NOMINAL POWER AND PATHLOSS COMPENSATION FACTOR OF A POWER CONTROL PROCESS

PRIORITY

This nonprovisional application is a U.S. National Stage Filing under 35 U.S.C. § 371 of International Patent Application Serial No. PCT/SE2014/051042 filed Sep. 10, 2014, and entitled "Method And Network Node For Obtaining Nominal Power And Pathloss Compensation Factor Of A Power Control."

TECHNICAL FIELD

Embodiments herein relate to wireless communication systems, such as cellular networks. In particular, a method and a network node for obtaining a nominal power of transmissions on an uplink channel and a pathloss compensation factor of a power control process for a cell of a cellular network are disclosed. A corresponding computer program and a carrier therefor are also disclosed.

BACKGROUND

Within a cellular network, a power control process controls power of transmissions from a user equipment, such as a mobile handset, a cellular phone or the like, to e.g. a radio base station. Transmissions from the user equipment to the radio base station are referred to as uplink (UL) transmissions and transmissions from the radio base station to the user equipment are referred to as downlink (DL) transmissions. The radio base station can operate one or more cells.

A Third Generation Partnership Project (3GPP) Long Term Evolution (LTE) network is a known cellular network. In the LTE network, one power control process is known as an UpLink Power Control (ULPC) process. The ULPC process is part of a so called Radio Resource Management (RRM) process of cellular networks, since the ULPC process directly impacts signal and interference levels at the radio base station. Moreover, battery consumption of the user equipment is impacted.

The ULPC process defined by the 3GPP for LTE network has several ULPC parameters, whose settings can be defined on a per cell basis. When the ULPC parameters are set to optimal, or near optimal values, low interference level and low battery consumption is achieved. However, at deployment of a new radio base station, it is difficult for an operator to find the optimal values for these parameters due to variable conditions relating to radio propagation, amount of traffic between the radio base station and the user equipment, interference and the like. For this reason, the ULPC parameters are often set to values, which are applied over the entire network. The values provide, in many cases, acceptable performance for the variable conditions. Thus, these values may be referred to as generic values herein. Even so, the generic values do not fully exploit flexibility of having the ULPC parameters defined on a per cell basis.

Therefore, after deployment, i.e. during operation, tuning of the ULPC parameters, i.e. adjustment towards the optimal, or near optimal values, may be performed by making various measurements in the network. The tuning is known as Coverage and Capacity Optimization, which is a feature of so called Self-Organizing Networks (SON). However, the provision of proper initial values, i.e. the standardized values, is greatly appreciated by the operator. Hence, the operator would benefit from a ULPC process having automated setting of the ULPC parameters.

The power control process itself has been studied in the literature. A number of different power control processes have been proposed. Among these, a fractional power control process has been selected by 3GPP for power control of a Physical Uplink Shared Channel (PUSCH) in LTE. The PUSCH is used for transmission of user data from the user equipment to the radio base station. In contrast thereto, a Physical Uplink Control Channel (PUCCH) is used for transmission of control data from the user equipment to the radio base station.

The fractional ULPC process comprises two working modes: an open-loop (OL) PC process and closed-loop (CL) PC process. The former aims to compensate for slow channel variations, while the latter adapts to changes in inter-cell interference conditions, measurement and/or power amplifier errors. In the standardized ULPC process, the user equipment transmits a specific transmission at a power is given by:

$$P_{TX} = \min \left\{ P_{tx_{max}}, \underbrace{P_0 + \alpha \cdot PL}_{\text{basic open-loop operating point}} + \underbrace{\Delta_{TF} + f(\Delta_{TPC})}_{\text{dynamic offset}} + \underbrace{10 \cdot \log_{10} M_{PUSCH}}_{\text{bandwidth factor}} \right\} [dBm], \quad (1)$$

where $P_{tx_{max}}$ is the maximum transmit power of the user equipment, $P_0$ is a nominal PUSCH power, which has a resolution of 1 dB, $\alpha$ is a path-loss compensation factor, whose values can be 0, 0.4, 0.5, 0.6, 0.7, 0.8, 0.9 and 1, PL are propagation losses, including antenna gains, $\Delta_{TF}$+f ($\Delta_{TPC}$) is a dynamic term depending on modulation scheme and power control commands and $M_{PUSCH}$ is the number of allocated Physical Resource Blocks (PRBs) for the specific transmission. Performance analysis of both OLPC and CLPC has been studied in many works, see e.g. Castellanos, C. U.; Villa, D. L.; Rosa, C.; Pedersen, K. I.; Calabrese, F. D.; Michaelsen, Per-Henrik; Michel, J., "Performance of Uplink Fractional Power Control in UTRAN LTE," Vehicular Technology Conference, 2008. VTC Spring 2008. IEEE, vol., no., pp. 2517, 2521, 11-14 May 2008.

Now returning to the setting and/or tuning of the ULPC parameters. An aim of planning and tuning the ULPC parameters is to find the best tradeoff between network capacity and coverage. Such a tradeoff exists because increasing $P_0$ and $\alpha$ in a cell (without adjusting them in surrounding cells) improves average and cell-edge user throughput in that cell, but degrades both average and cell-edge user throughput in surrounding cells. Because of this tradeoff, the ULPC tuning, when carried out for an entire network of an operator, can be formulated as a large-scale multivariate non-linear multi-objective optimization problem. This kind of problem is known to be hard to solve. Various solutions to do this problem do however exist. These solutions will be presented in the following, where $P_0$ is the nominal PUSCH power and $\alpha$ is the path-loss compensation factor as above.

In Castellanos, C. U.; Villa, D. L.; Rosa, C.; Pedersen, K. I.; Calabrese, F. D.; Michaelsen, Per-Henrik; Michel, J., "Performance of Uplink Fractional Power Control in UTRAN LTE", Vehicular Technology Conference, 2008. VTC Spring 2008. IEEE, vol., no., pp. 2517, 2521, 11-14 May 2008, a sensitivity analysis of ULPC parameters is carried out for different scenarios. Such an analysis evaluates network performance obtained by any pair of values of $P_0$ and $\alpha$ over a network-level simulator implementing a regular scenario. Briefly, a regular scenario refers to that cells are spaced at equal distances from each other where the locations of the cells, i.e. the locations of the base stations, form a regular pattern. From this analysis, based on brute-force enumeration approach, two different pairs of values of $P_0$ and $\alpha$ are obtained. One of the pairs is suggested for coverage-limited scenarios and the other pair is suggested for interference-limited scenarios. These suggested pairs can be used in the real network provided that the type of scenario is known a priori or it is deduced from network measurements, before or after deployment.

A similar approach is used in US20130310102, where cells are first classified based on pathloss measurements, and ULPC settings are then selected for each cell depending on the type of cell.

In S. Xu et al., "Coverage and capacity optimization in LTE network based on non-cooperative games", The Journal of China Universities of Posts and Telecommunications, 2012, the problem of optimizing ULPC parameter settings in a multi-cell scenario is formulated as a non-cooperative game model. Then, a heuristic iterative optimization algorithm is proposed, where cells report ULPC settings to the network management system and exchange power and interference information with their neighbor cells. The proposed algorithm only adjusts $P_0$ and does not consider closed-loop ULPC behavior.

Similarly, in M. Dirani et al., "Self-organizing networks in next generation radio access networks: Application to fractional power control", Computer Networks, 2011, a self-tuning algorithm for adjusting the pathloss compensation factor, $\alpha$, in the standardized fractional ULPC algorithm is proposed based on fuzzy reinforcement learning techniques.

In US2014051475, the ULPC optimization problem is solved by applying a genetic algorithm, where a simple network performance model is used to find the best solution in each new generation.

In K. Majewski, M. Koonert "Analytic uplink cell load approximation for planning fractional power control in LTE networks", Telecommunication Systems (Springer), September 2011, the authors propose a self-planning algorithm to jointly optimize $P_0$ and $\alpha$ in the fractional ULPC algorithm standardized for LTE. The algorithm consists of 3 stages. In a first stage, the best homogeneous, i.e., network-wide, $P_0$ and $\alpha$ settings are found by a brute-force enumeration approach similar to that in "Performance of Uplink Fractional Power Control in UTRAN LTE" mentioned above.

Unlike "Performance of Uplink Fractional Power Control in UTRAN LTE" mentioned above, the method is applied to an irregular scenario by means of a system-level simulator implementing the real network scenario. In a second stage, a random local greedy search algorithm is used to find better $P_0$ settings on a cell basis. In this algorithm, a cell is randomly selected and its $P_0$ value is modified by a random amount, while keeping $\alpha$ fixed. This process continues until a large number of iterations are performed without improving the overall network performance. In the third stage, the same process is applied to find better $\alpha$ settings on a cell basis with the same $P_0$ settings computed in the previous step.

The approach of classifying cells in terms of coverage and interference conditions used in "Performance of Uplink Fractional Power Control in UTRAN LTE" can only give a rough approximation of the optimal values of $P_0$ and $\alpha$, since the number of possible solutions is limited. Moreover, there still remains the issue of how those recommended settings are computed. For this purpose, a regular network scenario is assumed to reduce computational complexity and ease the interpretation of results. Thus, the results do not consider local irregularities in the scenario, which are the source of subtle differences between cells in the real network. All these limitations can also be applicable to the method in US20130310102, which is mentioned above.

The solution proposed in "Coverage and capacity optimization in LTE network based on non-cooperative games", mentioned above, only deals with $P_0$. Moreover, the method is conceived as a black-box approach, where the optimization algorithm is applied directly onto the real network, without any analytical treatment of the problem. Should the method be used for self-planning, a network model would still be needed, e.g., a network-level simulator. Thus, the execution time, or computational time, and the solution quality of the self-planning process would be dependent on the network model.

The general purpose optimization proposed in "Self-organizing networks in next generation radio access networks: Application to fractional power control" and US2014051475, which are mentioned above, require many iterations to converge to the optimal solution. This is a drawback if a solution that has a short computational time is needed. Moreover, the methods are also conceived as a black-box approach, where the optimization algorithm is applied directly onto the real network. If applied for self-planning, a network model would still be needed.

The solution in "Analytic uplink cell load approximation for planning fractional power control in LTE networks", mentioned above, jointly optimizes $P_0$ and $\alpha$, and can be applied to irregular scenarios. However, it is based on a random search process, which requires evaluation of quality of many solutions, i.e. thousands of them. To assess the quality of each solution, computations must consider the whole network scenario, comprising many cells, which leads to a large execution time.

A problem of the known solutions may be that the computational complexity is too high. Accordingly, time for performing such calculations may also be too high. Thus, deployment of new base stations may have a high cost, e.g. in terms of computational time and required processing capacity.

SUMMARY

An object may be to reduce computational complexity in finding nominal power and path loss compensation factor to be used in a power control process of the above mentioned kind.

According to a first aspect, the object is achieved by a method, performed by a network node, for obtaining a nominal power "$P_0$" of transmissions on an uplink channel and a pathloss compensation factor "$\alpha$", which are to be used by a user equipment in a power control process for a cell of a cellular network. The user equipment is served by the cell. The cell is associated to a non-regular scenario, at least partly defined by respective locations of further cells of the cellular network. The further cells are neighbours to the cell, which is located at a location within the cellular network. The network node generates, for each further cell, a respective regular scenario in relation to the cell. The generation is at least based the respective location corresponding to said each further cell and the location of the cell.

The network node determines, also for each further cell, a respective $P_0$ and α respective α for each respective regular scenario. The network node applies a statistical formula to each of the respective $P_0$ and the respective α to obtain the nominal power and the path loss compensation factor to be applied by the user equipment in the cell.

According to a second aspect, the object is achieved by a network node configured to obtain a nominal power "$P_0$" of transmissions on an uplink channel and a pathloss compensation factor "α", which are to be used by a user equipment in a power control process for a cell of a cellular network. The user equipment is served by the cell. The cell is associated to a non-regular scenario, at least partly defined by respective locations of further cells of the cellular network, the further cells being neighbours to the cell, which is located at a location within the cellular network. The network node is configured to, for each further cell, generate a respective regular scenario in relation to the cell, wherein the generation is at least based the respective location corresponding to said each further cell and the location of the cell, and to determine a respective $P_0$ and α respective α for each respective regular scenario. The network node is further configured to apply a statistical formula to each of the respective $P_0$ and the respective α to obtain the nominal power and the path loss compensation factor to be applied by the user equipment in the cell.

According to further aspects, the object is achieved by a computer program and a carrier for the computer program corresponding to the aspects above.

According to the embodiments herein, the network node generates, e.g. in a first phase, the respective regular scenarios based on at least the respective location corresponding to said each further cell and the location of the cell. In this manner, a plurality of regular scenarios is created by the network node. For each regular scenario, a problem of finding the respective $P_0$ and the respective α may be solved analytically. Hence, the network node determines, e.g. in a second phase, the respective $P_0$ and α respective α for each regular scenario. Next, the network node aggregates, e.g. in a third phase, each of the respective $P_0$ and each of the respective α to provide the nominal power and the path loss compensation factor to be used in the power control process. The aggregation is performed by applying a statistical formula to all of the $P_0$:s and α:s.

Thanks to that problems of the plurality of regular scenarios, i.e. each respective regular scenario, may be solved analytically, reduced computational complexity may be achieved. The embodiments herein may provide a solution that has a reduced execution time, e.g. in comparison to solving the large-scale multivariate non-linear multi-objective optimization problem mentioned above. An advantage is hence that the present method may be executed whenever a new cell is introduced in the network.

Firstly, the analytic formulation of the problem, i.e. the generation of the regular scenarios, avoids the need for network-level simulators.

Secondly, also thanks to the use of regular scenarios, the present method advantageously reduces computational complexity thanks to symmetry in the regular scenario. This is achieved while still considering irregularities which are taken into account by the aggregation of the nominal power and the path loss compensation factor for each regular scenario.

Thirdly, the present method may be executed locally for one cell, without the need of calculating, or re-calculating, the nominal power and the path loss compensation factor for each cell in the entire network. Thus, addition of a new cell is done at a computationally low cost. Therefore, the present method may be particularly useful when finding the ULPC parameters for a new cell, being added to an existing scenario in a network already in use. According to the known solutions in the background section, the nominal power and the path loss compensation factor needs to be recalculated for all cells, not only for the new cell.

Increased network performance may be achieved thanks to that the ULPC parameter settings obtained according to the embodiments herein outperform the standardized values, i.e. the network-wide settings, currently implemented by operators.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
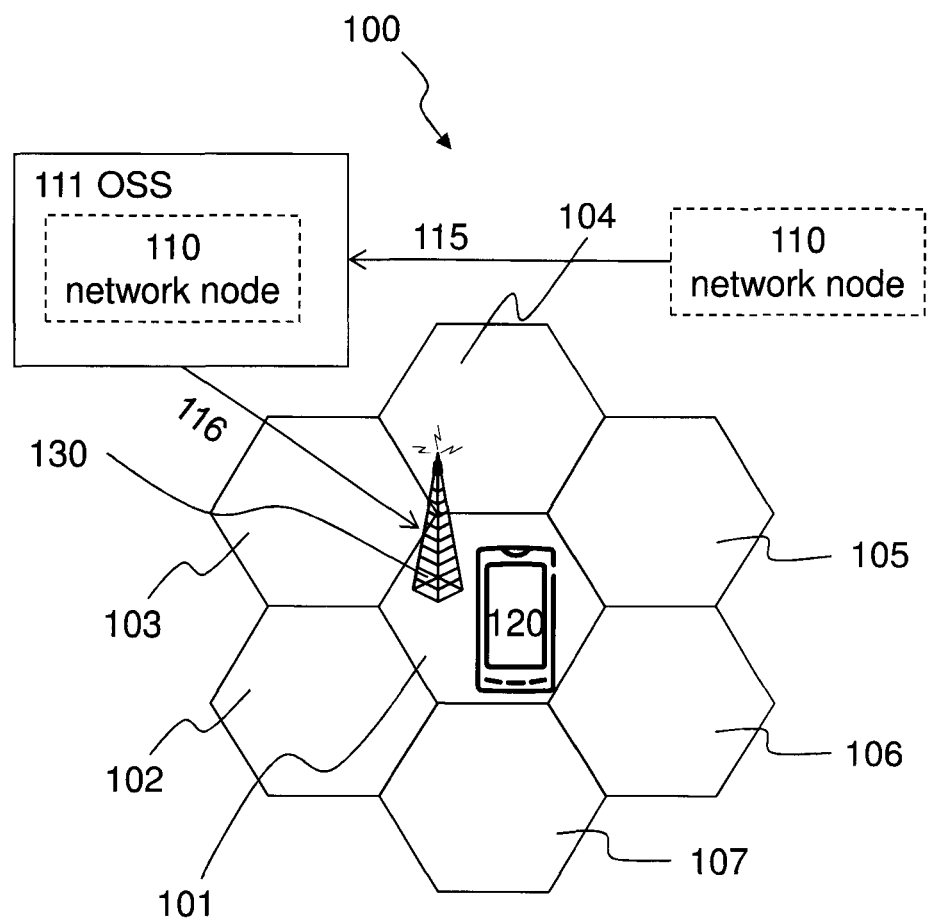
FIG. 1 is a schematic overview of an exemplifying cellular network in which embodiments herein may be implemented.

Throughout the following description similar reference numerals have been used to denote similar features, such as actions, steps, nodes, elements, units, modules, circuits, parts, items or the like, when applicable. In the Figures, features that appear in some embodiments are indicated by dashed lines.

FIG. 1 depicts an exemplifying cellular network 100 in which embodiments herein may be implemented. The cellular network 100 may be a Long Term Evolution (LTE) network or an evolution thereof. In more detail, the cellular network 100 may be a cellular radio communication network. Additionally, the network may be any 3GPP cellular communication network, such as a 5G network, 4G network, a Wideband Code Division Multiple Access (WCDMA) network, a Global System for Mobile communication (GSM) network or the like.

The cellular network 100 comprises a network node 110, in which embodiments herein may be implemented. The network node 110 may be an Operation and Support System (OSS) 111 or a part thereof. In other examples, the network node 110 may be a node, separate from the OSS.

In case the network node 110 is separate from the OSS 111, the network node 110 may communicate 115, e.g. via a wired or wireless connection, with the OSS 111.

The OSS 111 is configured for communication 116, e.g. by means of a connection, with a user equipment 120, typically via a radio network node 130. The connection is at least partially a radio connection, using a 3GPP radio interface, such as an Uu interface.

The user equipment 120 is located in a cell 101 operated by the cellular network 100. Accordingly, the cellular network 100 operates the cell 101.

Furthermore, the cellular network 100 operates a set of cells 102, 103, 104, 105, 106, 107. The set of cell 102-107 does not include the cell 101. Further cells 102, 103, 104, 105, 106, 107 may include one or more cells of the set of cells 102, 103, 104, 105, 106, 107. The further cells are neighbours to the cell 101. This means that the further cells are neighbouring cells with respect to the cell 101. A first tier neighbour cell of the further cells are directly adjacent to the cell 101 in that the first tier neighbour and the cell have at least one common border of their respective coverage areas. In the example of FIG. 1, all of the further cells are first tier neighbours, but as mentioned above, the further cells need not include all cells being first tier neighbours to the cell 101. In some examples, the further cells may also include one or more second tier neighbours (not shown), which are cells located just outside the cells indicated by 102, 103, 104, 105, 106, 107 in the Figure.

As used herein, the term "user equipment" may refer to a wireless device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. It may here also be noted that the term "user" may refer to the user equipment 120.

With the embodiments herein, a network node and a method therein for automatic planning of parameters for use in a power control process are provided. The parameters include a nominal power $P_0$ and a path loss compensation factor $\alpha$. The embodiments may handle irregular scenarios, where parameters of the ULPC process may need to be adjusted on a per-cell basis to achieve optimal, or near optimal, network performance. The network performance may refer to overall throughput of the network.

According to the embodiments herein, an automatic parameter planning algorithm for the standardized power control process in e.g. the Physical Uplink Shared Channel (PUSCH) of LTE is achieved. This means that a nominal power "$P_0$" of transmissions on an uplink channel and a pathloss compensation factor "$\alpha$", which are to be used by a user equipment in a power control process for a cell of a cellular network are obtained. The method aims at finding values of the nominal power and the path loss compensation factor, i.e. ULPC parameters, for any cell in the cellular network 100.

The method is applicable also be deployment of cells in the cellular network, i.e. when network performance measurements are not yet available.

Unlike known solutions presented in the background section, which are designed for regular scenarios, the embodiments herein handle irregular scenarios at a low computational complexity by formulating partial problems for a plurality of regular scenarios, for which the nominal power and path loss compensation factor may be solved analytically.

Figure 2A:
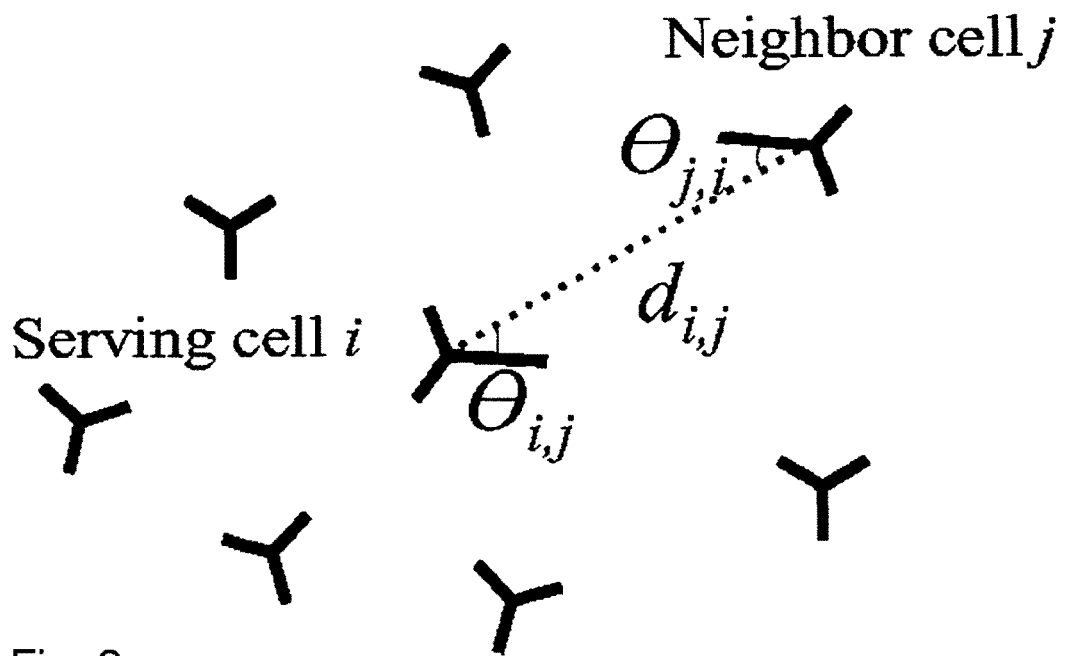
FIGS. 2a and 2b are schematic overviews, illustrating a regular and an irregular scenario, respectively.
Figure 2B:
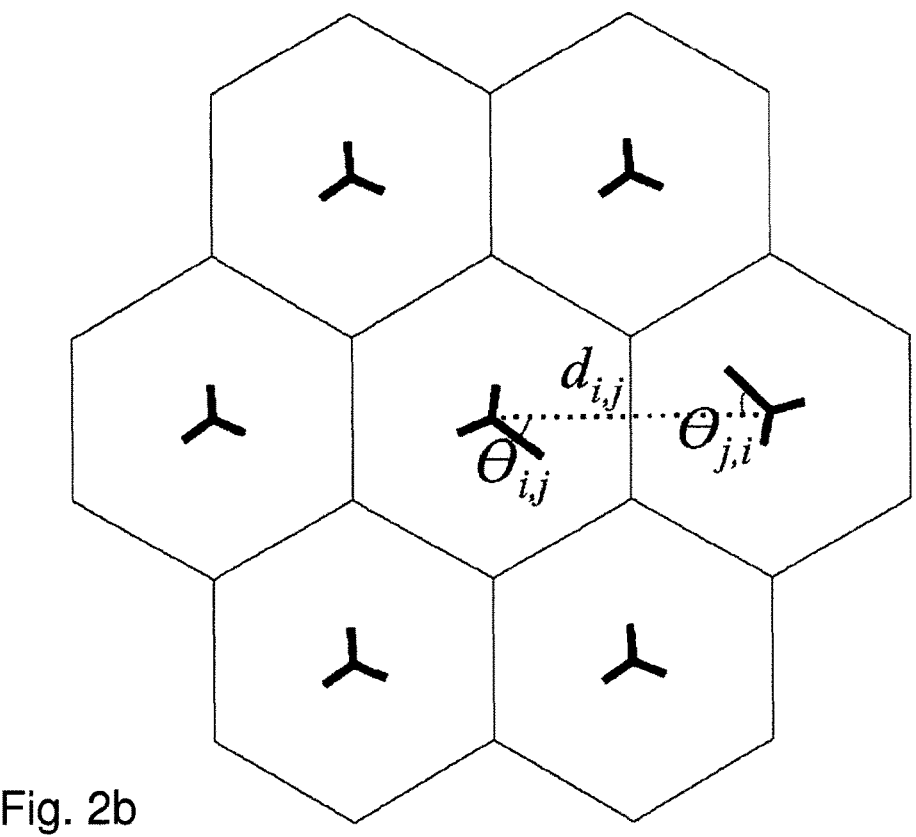

Before proceeding with the method according to embodiments herein, reference is made to FIGS. 2a and 2b in order to describe an irregular scenario and a regular scenario.

In FIG. 2a, an exemplifying irregular scenario is shown. A serving cell i and a neighbour cell j are located at a distance $d_{ij}$ from each other. Moreover, the angles $\theta_{j,i}$ and $\theta_{i,j}$ are defined to specify the relationship between the serving cell i and the neighbour cell j.

From this irregular scenario a regular scenario may be built, e.g. according to J. A. Fernández-Segovia, S. Luna-Ramírez, M. Toril and C. Úbeda. "Estimadores de rendimiento de red de bajo coste computacional en escenarios irregulares LTE",) XXVIII Simposium Nacional de Radio, URSI 2013. Referring to FIG. 2b, relative position of cells (i,j) are keeping from the irregular scenario. In this paper, some regular scenarios are built for every neighbor surrounding the cell 101 under study. For each regular scenario between the serving cell 101 and any neighbor 102-107, the relative geographical positions i.e., the distance between cells (Inter Site Distance) and relative antenna azimuth angles, are kept. Six neighbors of the first tier neighbors have the same azimuth angles and preserve the "selected neighbor" configuration, e.g. in terms of transmit power, antenna tilt, antenna gain.

Figure 3:
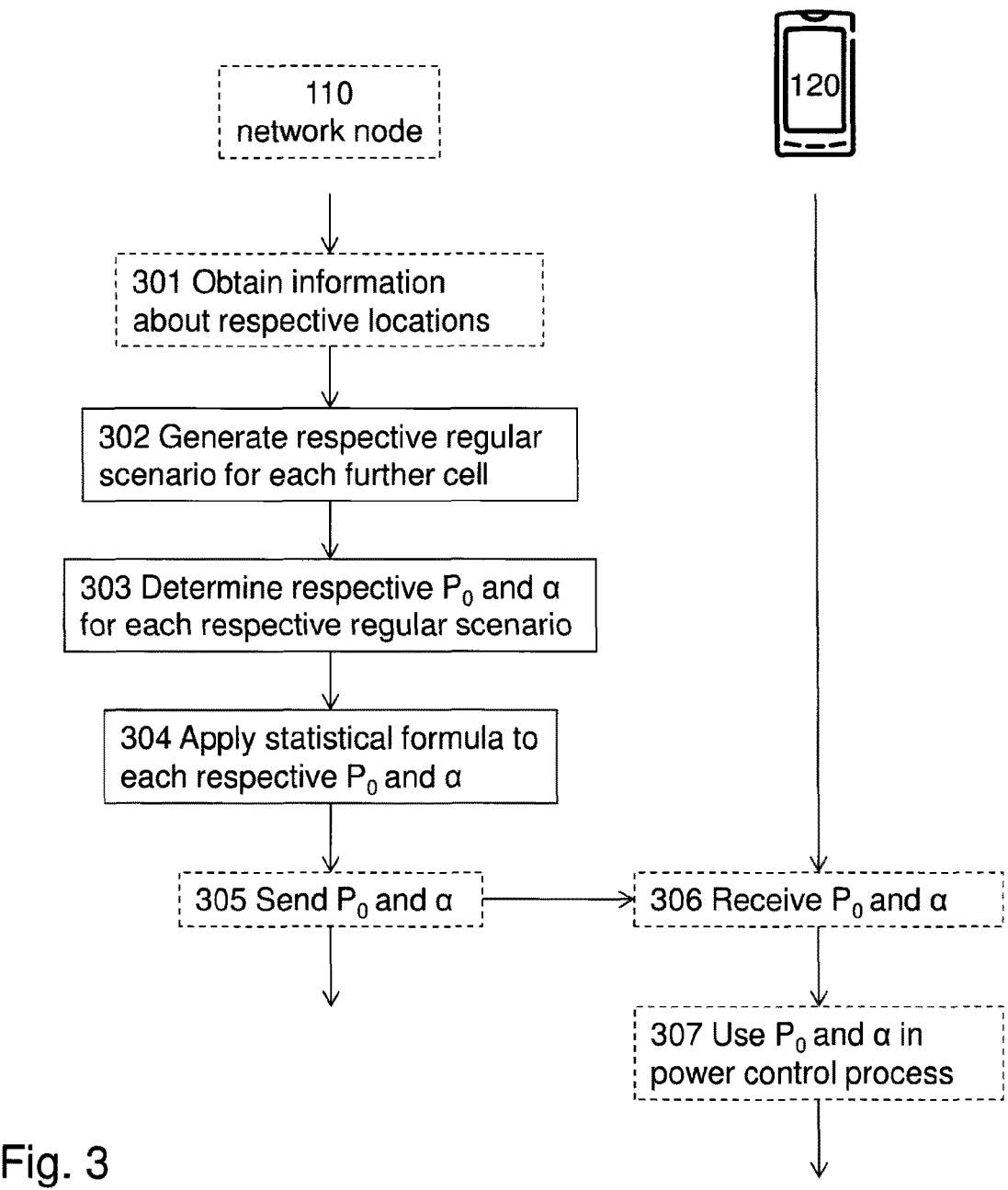
FIG. 3 is a schematic, combined signaling scheme and flowchart illustrating embodiments of the methods when performed in the cellular network according to FIG. 1.

FIG. 3 illustrates exemplifying methods when implemented in the cellular network 100 of FIG. 1. The network node 110 performs a method for obtaining the nominal power "$P_0$" of transmissions on an uplink channel and a pathloss compensation factor "$\alpha$", which are to be used by a user equipment 120 in a power control process for the cell 101 of the cellular network 100. The user equipment 120 is served by the cell 101. The cell 101 is associated to a non-regular scenario, at least partly defined by respective locations of further cells of the cellular network 100. The further cells are neighbours to the cell 101, which is located at a location within the cellular network 100. It may here be noted that the cell 101 may refer to the radio network node 130, which may transmit the power control parameters, i.e. the nominal power and the path loss compensation factor to the, or those, user equipment 120 connected to that radio network node 130. The user equipment 120 may then use the power control parameters for setting the actual power of its uplink transmissions.

The power control process relates to control of actual power of a specific transmission from the user equipment 120 to the radio network node 110 of the cellular network 100. In this context, the actual power of the specific transmission may be defined by Eg. 1. The specific transmission may refer to a transmission that has been scheduled, by the radio network node 130, for transmission at certain PRBs in a certain time slot, such as sub-frame in LTE.

The non-regular scenario may be defined by that the respective locations of the further cells and the location of the cell form an irregular geometric pattern. The respective regular scenario may be defined by that the respective locations of the further cells and the location of the cell form a regular geometric pattern. The power control process may relate to control of real power of transmissions on the uplink channel. The power control process may be an Open Loop Power Control process. The cellular network 100 may be based on Orthogonal Frequency-Division Multiple Access. The uplink channel may be a Physical Uplink Shared Channel.

The following actions may be performed in any suitable order.

Action 301

In order for the network node 110 to become aware of a respective location of each of the further cells, the network node 110 may obtain information about the The network node 110 may receive the information from the OSS 111 when the network node 110 is separate from the OSS 111.

Alternatively, when the network node 110 is comprised in the OSS 111, the network node 110 may fetch the information about respective locations of the further cells from the OSS 111.

In these manners, the network node 110 may gather all necessary information from the OSS 111.

Action 302

In order to simplify computational complexity, the network node 110 generates, for each further cell, a respective regular scenario in relation to the cell 101. The generation is at least based the respective location corresponding to said each further cell and the location of the cell 101.

The generation of the respective regular scenario may comprise mapping the non-regular scenario to the respective regular scenario.

As an example, for each cell, the network node 110 may build different regular scenarios for every, or at least some, neighbours of the cell 101, i.e. some selected neighbour cells. Every regular scenario is composed of the cell 101 and first tier of neighbours of the generated regular scenario. In this manner, each selected neighbour cell is reproduced. See also section "Building regular scenario" below.

An aim of constructing one regular scenario per neighbour cell is to take into account any irregularities of cell borders between the cell 101 and the further cells. Second, third etc. tier of neighbours may be used in some scenarios, whereby accuracy may be increased. Typically, at the cost of increased complexity for the calculation.

Action 303

The network node 110 determines, also for each further cell, a respective nominal power $P_0$ and a respective path loss compensation factor $\alpha$ for each respective regular scenario.

The network node 110 may find the respective $P_0$ and the respective $\alpha$ that fulfils a minimum coverage requirement and finding the respective $P_0$ and the respective $\alpha$ that maximises capacity of the cell 101. In this manner, a trade-off between coverage and capacity is achieved. See also section "Finding nominal power and path loss compensation for regular scenario" below.

Action 304

In order to aggregate the nominal powers and path loss compensation factors for each regular scenario, the network node 110 applies a statistical formula to each of the respective nominal power $P_0$ and the respective $\alpha$ to obtain the nominal power and the path loss compensation factor to be applied by the user equipment 120 in the cell 101. Accordingly, the aggregation of the regular scenarios provides for an approximate solution to the irregular scenario under study.

The network node 110 may apply the statistical formula by:

calculating the nominal power as a maximum among the respective $P_0$:s and the path loss compensation factor as a maximum among the respective $\alpha$:s;

calculating the nominal power as a mean over the respective $P_0$:s and the path loss compensation factor as a mean over the respective $\alpha$:s;

calculating the nominal power as a median over the respective $P_0$:s and the path loss compensation factor as a median over the respective $\alpha$:s;

calculating the nominal power as a minimum among the respective $P_0$:s and the path loss compensation factor as a minimum among the respective $\alpha$:s; and calculating the nominal power as a maximum or a minimum among or a mean or a median over the respective $P_0$:s and the path loss compensation factor as a maximum or a minimum among or a mean or a median over the respective $\alpha$:s.

The resulting values of the nominal power $P_0$ and the path loss compensation factor $\alpha$ for the cell, or the radio network node 110 may be stored in the OSS 111, or the network node 110.

In case the network node 110 is separate from the OSS 111, the nominal power $P_0$ and the path loss compensation factor may be sent to the OSS 111.

Action 305

The OSS 111, or the network node 110 when included in the OSS 110, may send the $P_0$ and $\alpha$ to the user equipment 120, whereby the user equipment 120 is capable of using the $P_0$ and $\alpha$ in a power control process for setting an actual power, or real power, of the transmissions on the uplink channel.

Typically, the nominal power $P_0$ and the path loss compensation factor $\alpha$ for the cell 101 may pass via the radio network node 130 of the cellular network 100.

This action may be repeated for any number of cells, or radio network nodes, for which actions 302 to 304, has been performed. When actions 302 to 304 have been performed updated values of the nominal power and the path loss compensation factor have been determined for any cell under consideration.

Action 306

When action 305 has been performed, the user equipment 120 may receive the nominal power and the path loss compensation factor to be used as long as the user equipment remains served by the radio network node 130.

Action 307

Upon on completion of action 306, the user equipment 120 may use the received nominal power and the received path loss compensation factor. In this manner, the user equipment 120 may adapt the uplink transmission power by modifying the power of its uplink transmissions, e.g. on PUSCH. The modification of the power may have a direct impact on experienced connection quality, and—ultimately—on uplink performance on a network wide level.

Finding Nominal Power and Path Loss Compensation for Regular Scenario

A purpose of finding nominal power $P_0$ and path loss compensation factor $\alpha$ for a cell i under consideration may be to at least nearly maximize an average user throughput in the cell i, $TH_{avg}(i)$, while keeping cell-edge throughput over a minimum predefined coverage value, $TH_{ce}(i) > TH_{ce,min}$. This is the typical formulation of the coverage and capacity optimization problem. $TH_{avg}$ stands for "Average cell throughput" and $TH_{ce}$ stands for Cell-edge throughput. The scheme described in FIG. 4 has been designed on an assumption that a regular scenario is considered, i.e. values of the ULPC parameter are the same in all cells of the regular scenario. This local optimization, or near optimization, scheme is run to jointly adjust $P_0$ and $\alpha$ in each regular scenario constructed in action 302.

Figure 4:
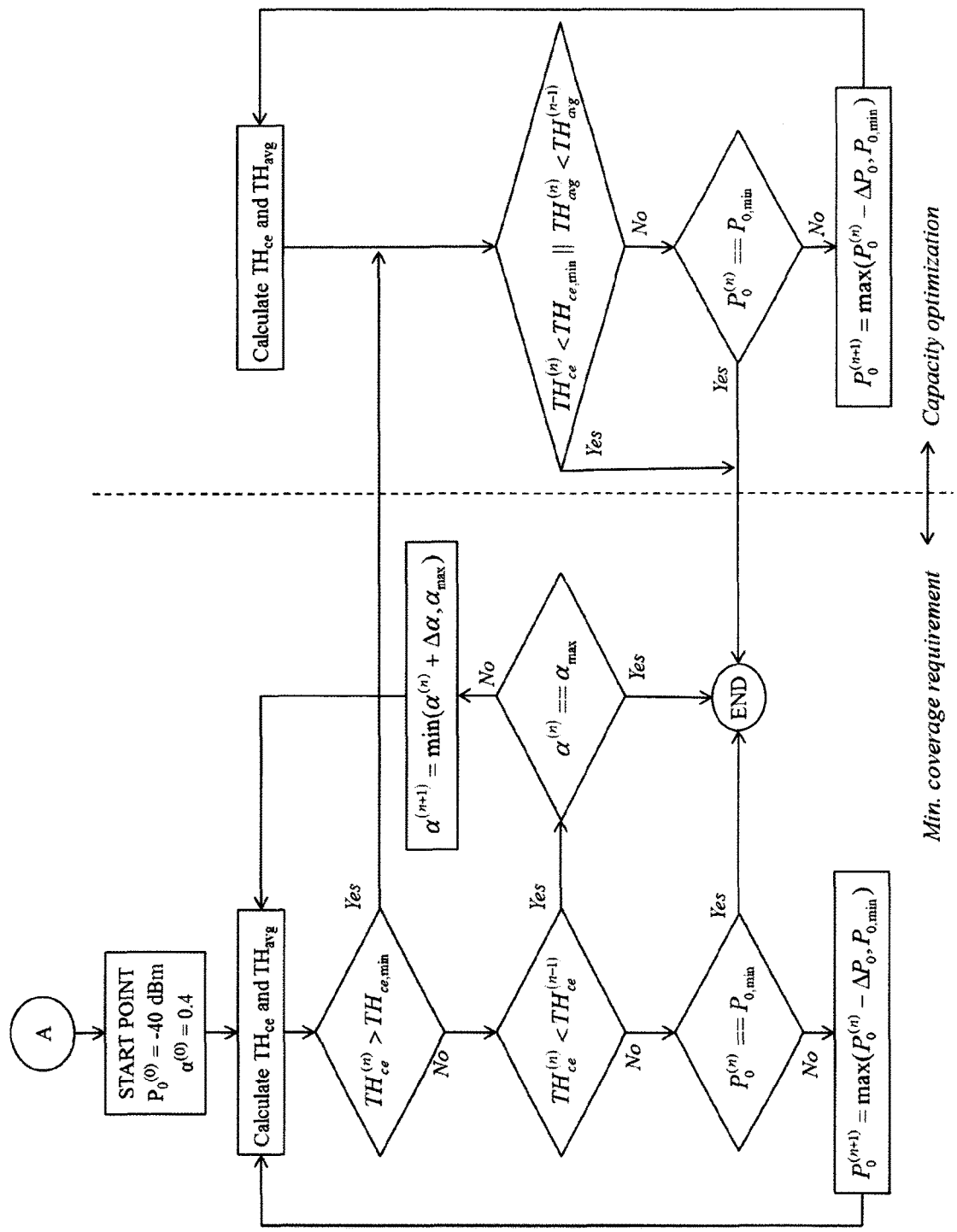
FIG. 4 is a flowchart illustrating a method for finding $P_0$ and α in a regular scenario.

FIG. 4 shows a flowchart of the proposed scheme. Briefly, the scheme is a gradient-based local optimization method, where $P_0$ and $\alpha$ are initially configured to arbitrarily values, e.g. $P_0$=−40 dBm and α=0.4. Then, the scheme iteratively increases/decreases the values of $P_0$ and α, e.g. in a stepwise manner, until a locally optimized solution is found.

In more detail, as a first stage, when minimum cell-edge throughput is not fulfilled, the scheme tries to increase $TH_{ce}(i)$ by decreasing $P_0$. Once coverage constraints are fulfilled, the scheme tries to maximize capacity by decreasing $P_0$ until $TH_{avg}(i)$ starts to decrease (i.e., optimal $P_0$ has been surpassed or cell-edge throughput has become less than the minimum threshold). α is only increased when cell-edge throughput is not fulfilled even for the optimal $P_0$ in terms of cell-edge throughput (i.e., $TH_{ce}(i)<TH_{ce,min}$ even when $TH_{ce}(i)$ is maximum). The thresholds mentioned here may be set by the operator.

Note that, the scheme provides a proposal of a single value for $P_0$ and a single value for a for all cells in the regular scenario. The extension of this scheme to irregular scenarios is described in the following.

Extension for a Non-Regular Scenario

In practice, propagation, traffic and interference conditions vary greatly among cells in a real network, such as the cellular network 100. Hence, variations in propagation, traffic and interference conditions translate into uneven optimal parameter configuration. The uneven optimal, or near optimal parameter configuration, i.e. ULPC parameter settings, refers to that different $P_0(i)$ and α(i) is required for each cell i of the cellular network 100. $P_0(i)$ and α(i) may also be written as $P_{0i}$ and $α_i$.

To find optimal, or near optimal, per-cell settings, several methods can be used. In a first approach according to prior art, the overall planning problem can be formulated as a large-scale multi-variate optimization problem and solved by applying some iterative optimization method to a model of the scenario implemented in a network-level simulator.

Unfortunately, this global approach is not an option due to large computational load associated to:

a) large solution space in search of optimal one, which solution space is in the order of $2^{Ncells}$, where Ncells is the number of cells in the network, and b) simulation time required to verify overall network performance for each solution, especially for large cellular networks.

According to the embodiments herein, the large-scale multi-variate optimization problem is be broken down into Ncells single optimization problems. Some approximation may be performed in order to model each local scenario for the cell under study into a regular scenario, see action 302. Then, the algorithm of FIG. 4 is applied. Regularizing the scenario has several advantages from a computational perspective:

a) the grid resolution to obtain accurate propagation predictions is lower for regular scenarios than for irregular scenarios, and b) neighbor cell calculations can be aggregated in a regular scenario, whereas they have to be treated individually in an irregular scenario due to the lack of symmetry.

Referring to a), it shall be understood that the grid resolution may be related to the grid of points selected in any scenario to perform propagation calculations in a network simulator. Thus, using a regular scenario, where distances to the radio network nodes are repeated, simplifies the amount of calculations even with more resolution, e.g. distance between points.

However, note that every new proposal of $P_0(i)$ and α(i) would require re-computing of parameter settings in neighbor cells, since changes in transmit power and load cause changes in interference levels. Such an iterative method may require many iterations and stability is not guaranteed.

Figure 5:
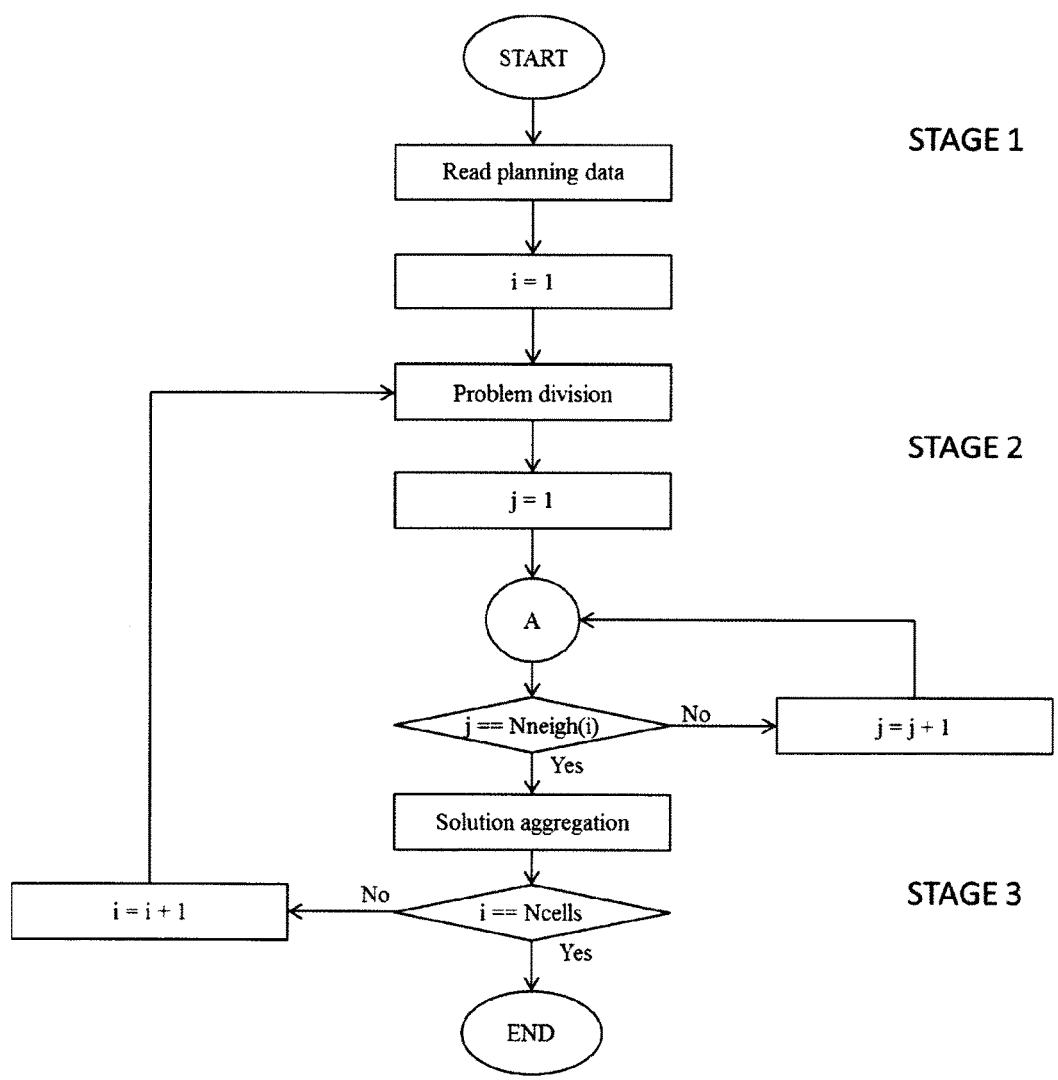
FIG. 5 is a flowchart illustrating an exemplifying embodiment.

The method according to embodiments herein is shown in FIG. 5. The method includes three stages, STAGE 1, 2 and 3.

STAGE 1—Data Acquisition and Neighbor Identification.

Network configuration data, consisting of site locations and distance to other sites, antenna height and antenna bearings, e.g. azimuth and tilt bearings, is collected first. The neighbor identification can be manual, i.e., determined by operator, or automatically determined from planning data. See also action 301.

STAGE 2—Adjacency-Based Problem Division.

Once neighbors have been defined for each cell, the method according to embodiments herein proceeds with, creating Ncells local optimization problems, which are solved independently. A local optimization process for the cell i is additionally broken down into Nneigh(i) subprocesses, where Nneigh(i) is the number of non-co-sited neighbors of cell i. At least one regular scenario is preferably constructed for each pair of cells (i, j), where cell i is the under-planning cell, i.e. cell under study, and cell j is the selected neighbor. Thus, Nneigh(i) regular scenarios are built for each cell i. Estimations of cell throughputs are obtained from each regular scenario, so the planning algorithm is run for every regular scenario. See also action 302 and 303.

Next Nneigh(i) pairs of optimal $(P_0(i,j), α(i,j))$ values are obtained for each cell i. See also action 302 and 303. In this context, it shall be said that for the cell i under study, e.g. the cell 101, $P_0(i,j)$ corresponds to the respective $P_0$ and α(i,j) corresponds to the respective α according to the wording in action 303. The respective $P_0$ and the respective α are determined for each neighbor to the cell 101.

STAGE 3—Aggregation of Adjacency-Level Solutions

Some aggregation process is therefore needed to obtain a single solution per cell (i.e., $P_0(i)$ and α(i)). A single value of $(P_0(i), α(i))$ is computed from all values $(P_0(i,j), α(i,j))$ with a statistical formula.

The statistical formula may be any one of:

Max method: selects maximum values of $P_0(i,j)$ and α(i,j).

$P_0(i)=\max(P_0(i,j))$, $α(i)=\max(α(i,j))$

Mean method: selects average values of $P_0(i,j)$ and α(i,j).

$P_0(i)=\mathrm{mean}(P_0(i,j))$, $α(i)=\mathrm{mean}(α(i,j))$

Median method: selects median of values of $P_0(i,j)$ and α(i,j).

$P_0(i)=\mathrm{median}(P_0(i,j))$, $α(i)=\mathrm{median}(α(i,j))$

Min method: selects minimum values of $P_0(i,j)$ and α(i,j).

$P_0(i)=\min(P_0(i,j))$, $α(i)=\min(α(i,j))$

Mix methods: selects any combination of $P_0(i)$ and α(i) given by the other methods, e.g., max method for $P_0(i)$ and mean method for α(i).

See also action 304.

The proposed embodiments are applied to a real scenario, and later tested with a network-level simulator. The considered scenario consists of 55 sites (165 eNBs) in a metropolitan area. Location, azimuth and antenna tilts are obtained from network configuration data. Inter Site Distance (ISDs) range from 0.5 to 3 km. Other simulation parameters are shown in Table 1.

TABLE 1

Scenario under test.

| Parameters | Settings |
|---|---|
| Spectrum allocation | 10 MHz |
| Carrier Frequency | 734 MHz |
| Cell layout | 55 sites, 165 cells. |
| Attenuation model | 152.72 − 13.82 · $\log_{10}(h_b)$ + (64.38 − 6.55 · $\log_{10}(h_b)$) · $\log_{10}(d)$, where $h_b$ is the antenna height [m] and d is the distance [km]. |
| Slow fading, σ | 8 dB |
| Thermal noise density | −174 dBm/Hz |
| Antenna height | From real scenario: 10.67 m-45.12 m |
| Cell load | From real scenario: 5%-17.43% |

The proposed embodiments have been tested with five different aggregation methods, namely, max, mean, median, mix and min. As a baseline solution, network performance with uniform parameter settings (i.e., $P_0(i)=P_0(j)$ and $\alpha(i)=\alpha(j)$, $\forall i,j$) is also simulated to quantify the benefit of algorithms described herein. To assess methods, the resulting $P_0$ and α settings are tested in a static system-level LTE simulator implementing the scenario. Two performance indicators are used: a) as a measure of network capacity, average cell throughput, $\overline{TH_{avg}(I)}$, computed by averaging average user throughput across cells in the scenario, and b) as a measure of coverage, average cell-edge throughput, $\overline{TH_{ce}(I)}$, computed by averaging cell-edge throughput across cells in the scenario.

Figure 6:
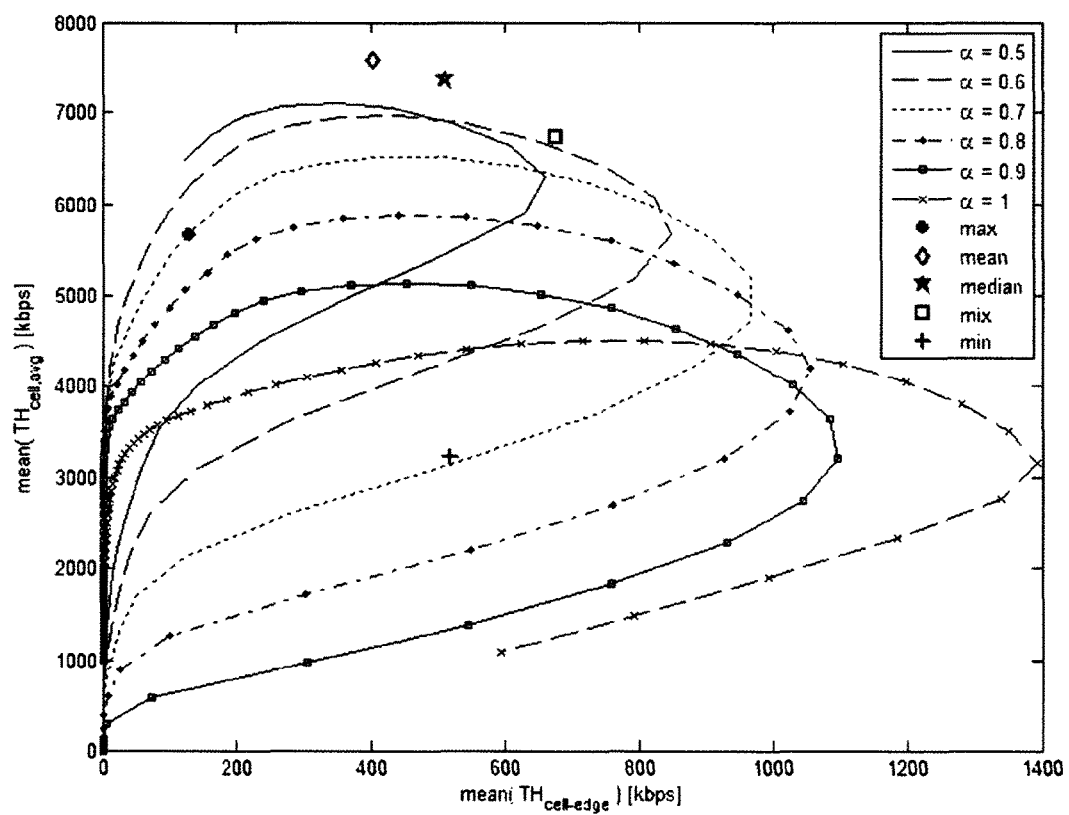
FIG. 6 is a diagram, illustrating throughput at cell average versus and throughput at cell-edge.

FIG. 6 shows the performance of the different uneven ULPC parameter settings suggested by the planning algorithms. For comparison purposes, the results of regular solutions are superimposed. These regular solutions are represented as a set of curves which have been built doing a $P_0$ sweep (−40 dBm to −120 dBm) for different values of α. Each point in the curves evaluates the coverage and capacity for a network uniform setting of $P_0$ and α. This set of curves can be considered as a rough planning method.

In FIG. 6 it is observed that mean, median and mix methods outperform all regular settings solutions. Thus, any of them could be proposed as a planning method which provides improvement as compared to existing solutions. An exemplifying advantage with the embodiments herein is that execution gain is up to ten times less than the time expended calculating the set of curves of regular settings in a medium scenario (200~300 cells). This gain is higher as the number of cells increases.

Figure 7:
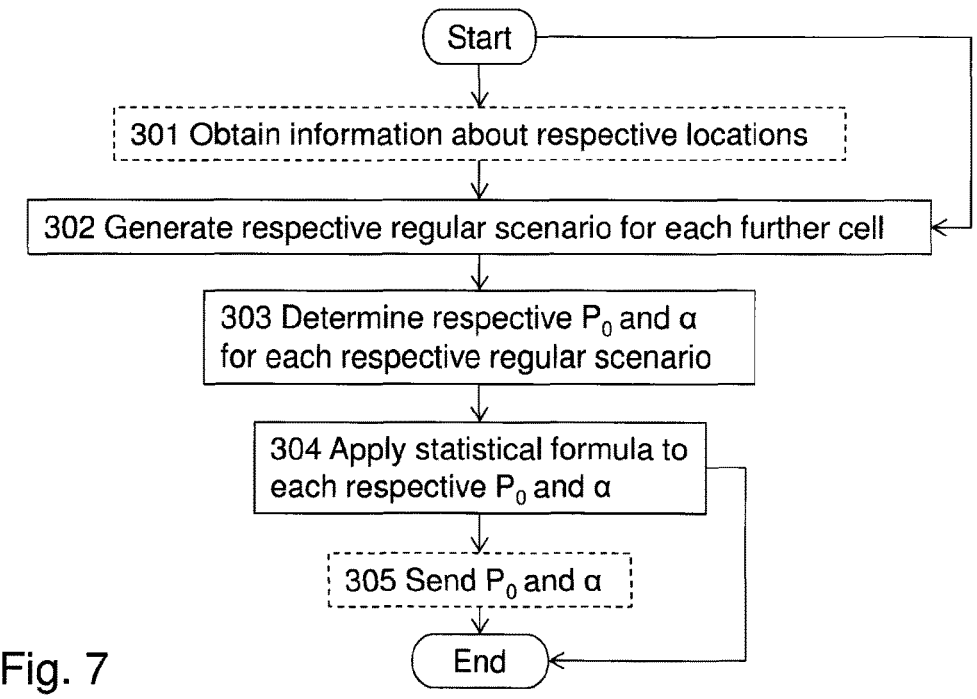
FIG. 7 is a flowchart illustrating embodiments of the method in the network node.

In FIG. 7, an exemplifying, schematic flowchart of the method in the network node 110 is shown. The same reference numerals as used in connection with FIG. 3 have been applied to denote the same or similar actions.

Again, the network node 110 performs a method for obtaining a nominal power "$P_0$" of transmissions on an uplink channel and a pathloss compensation factor "α", which are to be used by a user equipment 120 in a power control process for a cell 101 of a cellular network 100.

As mentioned above, the user equipment 120 is served by the cell 101. The cell 101 is associated to a non-regular scenario, at least partly defined by respective locations of further cells of the cellular network 100. The further cells are neighbours to the cell 101, which is located at a location within the cellular network 100.

Again mentioned above, the non-regular scenario may be defined by that the respective locations of the further cells and the location of the cell form an irregular geometric pattern. The respective regular scenario may be defined by that the respective locations of the further cells and the location of the cell form a regular geometric pattern. The power control process may relate to control of real power of transmissions on the uplink channel. The power control process may be an Open Loop Power Control process. The cellular network 100 may be based on Orthogonal Frequency-Division Multiple Access. The uplink channel may be a Physical Uplink Shared Channel.

The following action may be performed in any suitable order.

Action 301

The network node 110 may obtain information about the respective locations of the further cells from an Operation and Support System.

Action 302

The network node 110 generates, for each further cell, a respective regular scenario in relation to the cell 101. The generation is at least based the respective location corresponding to said each further cell and the location of the cell 101.

The generation of the respective regular scenario may comprise mapping the non-regular scenario to the respective regular scenario.

Action 303

The network node 110 determines, also for each further cell, a respective $P_0$ and a respective α for each respective regular scenario The determining may comprise finding the respective $P_0$ and the respective α that fulfils a minimum coverage requirement and finding the respective $P_0$ and the respective α that maximises capacity of the cell 101.

Action 304

The network node 110 applies a statistical formula to each of the respective $P_0$ and the respective α to obtain the nominal power and the path loss compensation factor to be applied by the user equipment 120 in the cell 101.

The applying 304 of the statistical formula may comprise one of:

calculating the nominal power as a maximum among the respective $P_0$:s and the path loss compensation factor as a maximum among the respective α:s;

calculating the nominal power as a mean over the respective $P_0$:s and the path loss compensation factor as a mean over the respective α:s;

calculating the nominal power as a median over the respective $P_0$:s and the path loss compensation factor as a median over the respective α:s;

calculating the nominal power as a minimum among the respective $P_0$:s and the path loss compensation factor as a minimum among the respective α:s; and calculating the nominal power as a maximum or a minimum among or a mean or a median over the respective $P_0$:s and the path loss compensation factor as a maximum or a minimum among or a mean or a median over the respective α:s.

Action 305

The network node 110 may send the $P_0$ and α to the user equipment (120), whereby the user equipment is capable of using the $P_0$ and α in a power control process for setting a real power of the transmissions on the uplink channel. The sending of the $P_0$ and the α may pass via a radio network node 130 of the cellular network 100.

Figure 8:
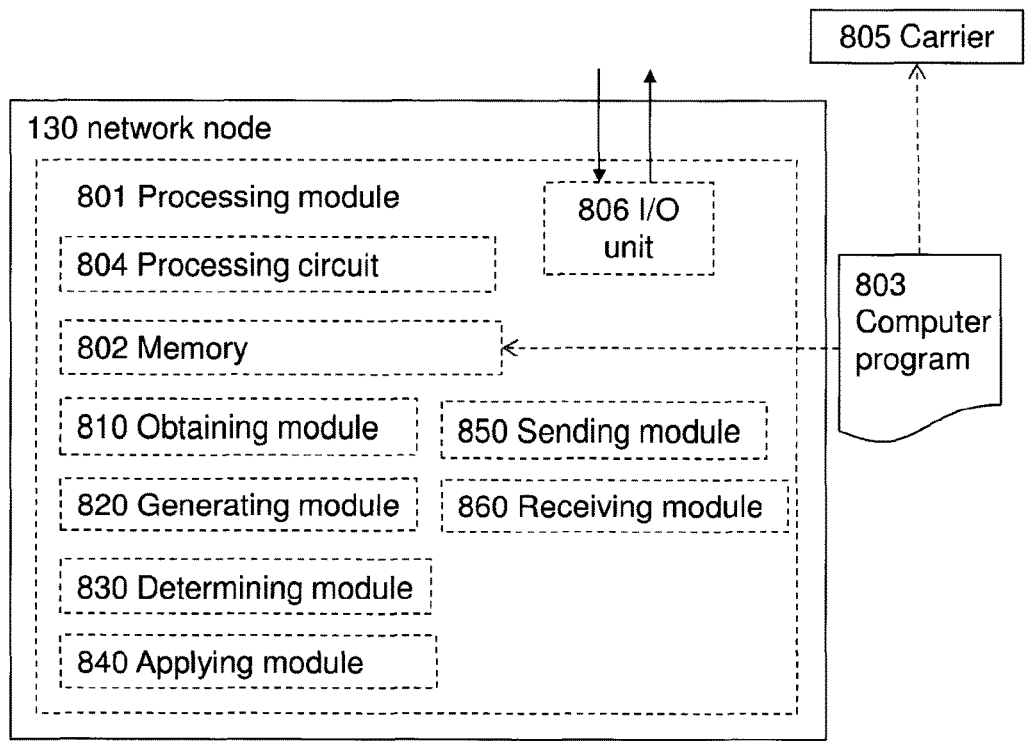
FIG. 8 is a block diagram illustrating embodiments of the network node.

With reference to FIG. 8, a schematic block diagram of the network node 110 is shown. The network node 110 is configured to obtain a nominal power "$P_0$" of transmissions on an uplink channel and a pathloss compensation factor "α", which are to be used by a user equipment 120 in a power control process for a cell 101 of a cellular network 100. As mentioned, the user equipment 120 is served by the cell 101. The cell 101 is associated to a non-regular scenario, at least partly defined by respective locations of further cells of the cellular network 100, the further cells being neighbours to the cell 101, which is located at a location within the cellular network 100, As mentioned, the non-regular scenario may be defined by that the respective locations of the further cells and the location of the cell form an irregular geometric pattern. The respective regular scenario may be defined by that the respective locations of the further cells and the location of the cell form a regular geometric pattern. The power control process may relate to control of real power of transmissions on the uplink channel. The power control process may be an Open Loop Power Control process. The cellular network 100 may be based on Orthogonal Frequency-Division Multiple Access. The uplink channel may be a Physical Uplink Shared Channel.

The network node 110 may comprise a processing module 801, such as a means, one or more hardware modules and/or one or more software modules for performing the methods described herein.

The network node 110 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the network node 110 is operative to perform the methods of FIG. 3 and/or FIG. 7.

In some other embodiments, the computer readable code units may cause the network node 110 to perform the method according to FIGS. 3 and/or 7 when the computer readable code units are executed by the network node 110.

FIG. 8 further illustrates a carrier 805, comprising the computer program 803 as described directly above. The carrier 805 may be one of an electronic signal, an optical signal, a radio signal, a computer readable medium and the like.

In some embodiments, the processing module 801 comprises an Input/Output (I/O) unit 806, which may be exemplified by a receiving module and/or a sending module as described below when applicable.

In further embodiments, the network node 110 and/or the processing module 801 may comprise one or more of an obtaining module 810, a generating module 820, a determining module 830, an applying module 840, a sending module 850 and a receiving module 860 as exemplifying hardware modules. In other examples, the aforementioned exemplifying hardware module may be implemented as one or more software modules. These modules are configured to perform a respective action as illustrated in e.g. FIG. 7.

Therefore, according to the various embodiments described above, the network node 110 is, e.g. by means of the processing module 801 and/or any of the above mentioned modules, operative to, e.g. is configured to, perform the method of FIG. 7.

Thus, the network node 110, the processing module 801 and/or the generating module 820 is configured to, for each further cell, generate a respective regular scenario in relation to the cell 101, wherein the generation is at least based on the respective location corresponding to said each further cell and the location of the cell 101.

The network node 110, the processing module 801 and/or the determining module 830 is configured to, for each further cell, determine a respective $P_0$ and a respective $\alpha$ for each respective regular scenario.

The network node 110, the processing module 801 and/or the applying module 840 is configured to apply a statistical formula to each of the respective $P_0$ and the respective $\alpha$ to obtain the nominal power and the path loss compensation factor to be applied by the user equipment 120 in the cell 101.

The network node 110, the processing module 801 and/or the determining module 830 may be configured to determine the respective $P_0$ and the respective $\alpha$ by finding the respective $P_0$ and the respective $\alpha$ that fulfils a minimum coverage requirement and finding the respective $P_0$ and the respective $\alpha$ that maximises capacity of the cell 101.

The network node 110, the processing module 801 and/or the applying module 840 may be configured to apply the statistical formula by being configured to one of:

calculate the nominal power as a maximum among the respective $P_0$:s and the path loss compensation factor as a maximum among the respective $\alpha$:s;

calculate the nominal power as a mean over the respective $P_0$:s and the path loss compensation factor as a mean over the respective $\alpha$:s;

calculate the nominal power as a median over the respective $P_0$:s and the path loss compensation factor as a median over the respective $\alpha$:s;

calculate the nominal power as a minimum among the respective $P_0$:s and the path loss compensation factor as a minimum among the respective $\alpha$:s; and calculate the nominal power as a maximum or a minimum among or a mean or a median over the respective $P_0$:s and the path loss compensation factor as a maximum or a minimum among or a mean or a median over the respective $\alpha$:s.

The network node 110, the processing module 801 and/or the obtaining module 810 may be configured to obtain information about the respective locations of the further cells from an Operation and Support System. In some embodiments, the receiving module 860 may be configured to receive the information about the respective locations of the further cells from an Operation and Support System.

The network node 110, the processing module 801 and/or the generating module 820 may be configured to generate the respective regular scenario by mapping the non-regular scenario to the respective regular scenario.

The network node 110, the processing module 801 and/or the sending module 850 may be configured to send the $P_0$ and $\alpha$ to the user equipment 120, whereby the user equipment is capable of using the $P_0$ and $\alpha$ in a power control process for setting a real power of the transmissions on the uplink channel.

The network node 110, the processing module 801 and/or the sending module 850 may be configured to send the $P_0$ and the $\alpha$ via a radio network node 130 of the cellular network 100.

As used herein, the term "processing module" may in some examples refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In these examples, the processing module is thus embodied by a hardware module. In other examples, the processing module may be embodied by a software module. Any such module, be it a hardware, software or combined hardware-software module, may be a determining means, estimating means, capturing means, associating means, comparing means, identification means, selecting means, receiving means, sending means or the like as disclosed herein. As an example, the expression "means" may be a module or a unit, such as a determining module and the like correspondingly to the above listed means.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "Number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a network node, for obtaining a nominal power "P0" of transmissions on an uplink channel and a pathloss compensation factor "$\alpha$", which are to be used by a user equipment in a power control process for a cell of a cellular network, wherein the user equipment is served by the cell, wherein the cell is associated to a non-regular scenario, at least partly defined by respective locations of further cells of the cellular network, the further cells being neighbours to the cell, which is located at a location within the cellular network, wherein the method comprises:
for each further cell:
generating a respective regular scenario in relation to the cell, wherein the generation is at least based the respective location corresponding to said each further cell and the location of the cell; and
determining a respective P0 and a respective $\alpha$ for each respective regular scenario; wherein the method comprises:
applying a statistical formula to each of the respective P0 and the respective $\alpha$ to obtain the nominal power and the path loss compensation factor to be applied by the user equipment in the cell,
wherein the applying of the statistical formula comprises one of:

calculating the nominal power as a maximum among the respective P0:s and the path loss compensation factor as a maximum among the respective $\alpha$:s;
calculating the nominal power as a mean over the respective P0:s and the path loss compensation factor as a mean over the respective $\alpha$:s;
calculating the nominal power as a median over the respective P0:s and the path loss compensation factor as a median over the respective $\alpha$:s;
calculating the nominal power as a minimum among the respective P0:s and the path loss compensation factor as a minimum among the respective $\alpha$:s; and
calculating the nominal power as a maximum or a minimum among or a mean or a median over the respective P0:s and the path loss compensation factor as a maximum or a minimum among or a mean or a median over the respective $\alpha$:s.

2. The method according to claim 1, wherein the determining comprises finding the respective P0 and the respective $\alpha$ that fulfils a minimum coverage requirement and finding the respective P0 and the respective $\alpha$ that maximises capacity of the cell.

3. The method according to claim 1, wherein the method comprises:
obtaining information about the respective locations of the further cells from an Operation and Support System.

4. The method according to claim 1, wherein the generation of the respective regular scenario comprises mapping the non-regular scenario to the respective regular scenario.

5. The method according to claim 1, wherein the method comprises:
sending the P0 and a to the user equipment, whereby the user equipment is capable of using the P0 and $\alpha$ in a power control process for setting a real power of the transmissions on the uplink channel.

6. The method according to claim 5, wherein the sending of the P0 and the $\alpha$ passes via a radio network node of the cellular network.

7. The method according to claim 1, wherein the power control process relates to control of real power of transmissions on the uplink channel.

8. The method according to claim 1, wherein the power control process is an Open Loop Power Control process.

9. A network node configured to obtain a nominal power "P0" of transmissions on an uplink channel and a pathloss compensation factor "$\alpha$", which are to be used by a user equipment in a power control process for a cell of a cellular network, wherein the user equipment is served by the cell, wherein the cell is associated to a non-regular scenario, at least partly defined by respective locations of further cells of the cellular network, the further cells being neighbours to the cell, which is located at a location within the cellular network, wherein the network node is configured to:
for each further cell:
generate a respective regular scenario in relation to the cell, wherein the generation is at least based the respective location corresponding to said each further cell and the location of the cell; and
determine a respective P0 and a respective $\alpha$ for each respective regular scenario; and wherein the network node is configured to:
apply a statistical formula to each of the respective P0 and the respective $\alpha$ to obtain the nominal power and the path loss compensation factor to be applied by the user equipment in the cell, wherein the statistical formula is applied by being configured to one of:

calculate the nominal power as a maximum among the respective P0:s and the path loss compensation factor as a maximum among the respective $\alpha$:s;

calculate the nominal power as a mean over the respective P0:s and the path loss compensation factor as a mean over the respective $\alpha$:s;

calculate the nominal power as a median over the respective P0:s and the path loss compensation factor as a median over the respective $\alpha$:s;

calculate the nominal power as a minimum among the respective P0:s and the path loss compensation factor as a minimum among the respective $\alpha$:s; and calculate the nominal power as a maximum or a minimum among or a mean or a median over the respective P0:s and the path loss compensation factor as a maximum or a minimum among or a mean or a median over the respective $\alpha$:s.

10. The network node according to claim 9, wherein the network node is configured to determine the respective P0 and the respective $\alpha$ by finding the respective P0 and the respective $\alpha$ that fulfils a minimum coverage requirement and finding the respective P0 and the respective $\alpha$ that maximises capacity of the cell.

11. The network node according to claim 9, wherein the network node is configured to:

obtain information about the respective locations of the further cells from an Operation and Support System.

12. The network node according to claim 9, wherein the network node is configured to generate the respective regular scenario by mapping the non-regular scenario to the respective regular scenario.

13. The network node according to claim 9, wherein the network node is configured to:

send the P0 and a to the user equipment, whereby the user equipment is capable of using the P0 and $\alpha$ in a power control process for setting a real power of the transmissions on the uplink channel.

14. The network node according to claim 13, wherein the network node is configured to send the P0 and the $\alpha$ via a radio network node of the cellular network.

15. The network node according to claim 9, wherein the non-regular scenario is defined by that the respective locations of the further cells and the location of the cell form an irregular geometric pattern.

16. The network node according to claim 9, wherein the respective regular scenario is defined by that the respective locations of the further cells and the location of the cell form a regular geometric pattern.

17. The network node according to claim 9, wherein the power control process relates to control of real power of transmissions on the uplink channel.

18. The network node according to claim 9, wherein the power control process is an Open Loop Power Control process.

* * * * *